June 13, 1961 W. J. STROH 2,988,594

CONTRAST CONTROL CIRCUIT

Filed May 7, 1958

INVENTOR
Walter J. Stroh
BY Francis W. Crotty
ATTORNEY 2,988,594
Patented June 13, 1961

2,988,594

CONTRAST CONTROL CIRCUIT

Walter J. Stroh, Barrington, Ill., assignor to Zenith Radio Corporation, a corporation of Delaware Filed May 7, 1958, Ser. No. 733,530
4 Claims. (Cl. 178—7.3)

Figure 1:
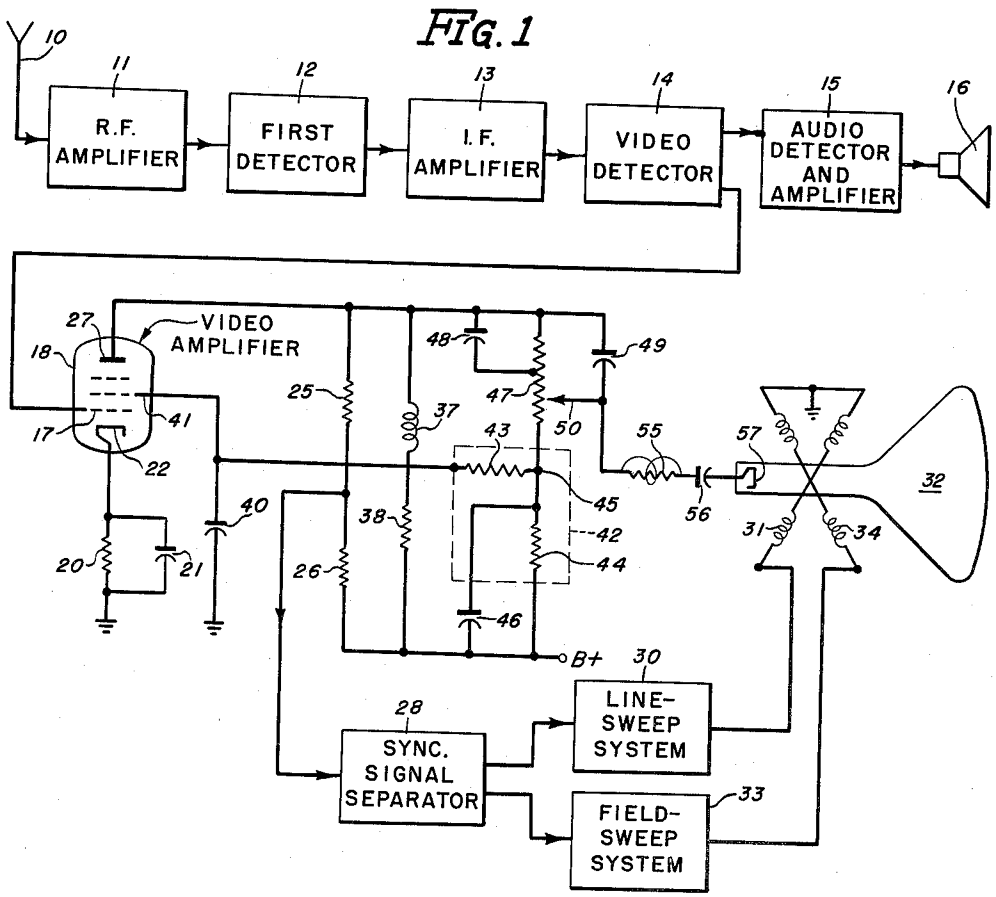

This invention relates to television receivers and more particularly to an improved contrast-control circuit for use in such receivers.

In a television receiver a control arrangement is normally provided to regulate the contrast, or difference in illumination, between light and dark areas of the displayed image. Conventionally this regulation is accomplished by a contrast control circuit which typically includes a high-resistance potentiometer having a fixed terminal coupled to the plate circuit of the video output stage and a movable tap coupled to an input electrode of the image display device. Thus, variation in the position of the movable tap effects a corresponding variation in the amplitude of the video signal coupled from the video output stage to the image reproducer. However, in addition to the alternating current (A.-C.) video signal coupled across the contrast potentiometer, normally at least a portion of the video output tube direct current also flows through the contrast control potentiometer. As used herein, "tube direct current" refers to the static component of D.-C. tube current. It is recognized that the signal coupled from the video detector may have a D.-C. component; in this event, the current flow at the anode of the video amplifier includes both a static (tube current) D.-C. component and a dynamic (signal) D.-C. component. The invention is not directed to the dynamic D.-C. component. Even this small direct-current (D.-C.) flow in the contrast control potentiometer is sufficient to cause an appreciable power dissipation. High power dissipation requirements are undesirable because the use of a larger and more expensive potentiometer is necessary to allow for the additional dissipation.

It is an object of this invention, therefore, to provide a contrast control circuit in which only a negligible portion of the D.-C. tube current flows through the contrast control potentiometer.

It is another object of the invention to provide such a contrast control circuit which is appreciably more economical than prior art circuits.

In accordance with the invention, a contrast control circuit for a television receiver comprises a video amplifier including an electron-discharge device having an input electrode, an intermediate electrode, and an output electrode. A video load is coupled between the output electrode and a source of unidirectional operating potential, and establishes a predetermined operating potential at the output electrode. A voltage divider is coupled between the intermediate electrode and the source; the divider having a tap thereon which exhibits a potential substantially equal to the aforesaid operating potential of the output electrode. A contrast control network having a D.-C. impedance large with respect to the D.-C. impedance of the video load, is coupled between the output electrode and the tap. Also included are means for applying a received television signal to the input electrode and means, coupled to the contrast control network, for utilizing at least a portion of the amplified voltage appearing at the output electrode.

Figure 2:
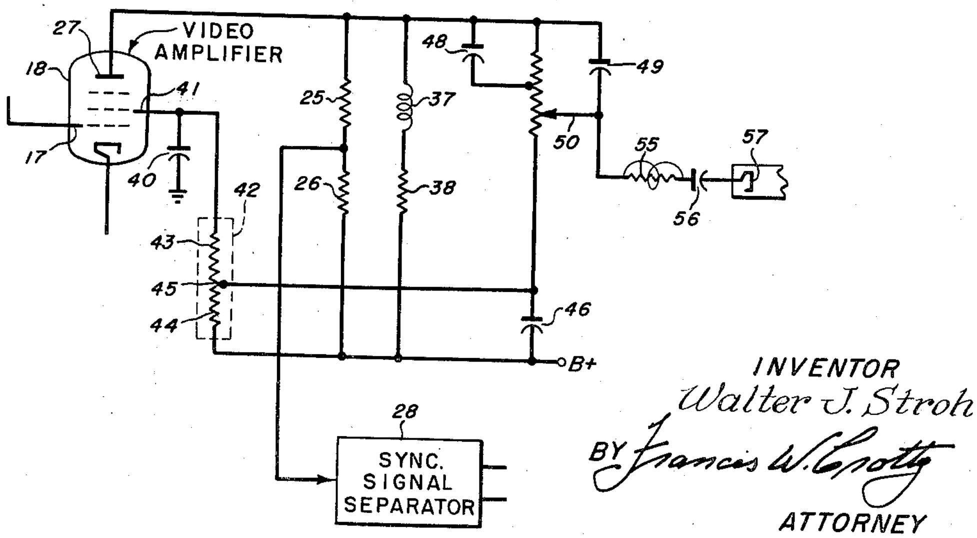

The features of the invention which are believed to be novel are set forth with particularity in the appended claims. The invention, together with further objects and advantages thereof, may best be understood, however, by reference to the following description taken in conjunction with the accompanying drawing, in the several figures of which like reference numerals identify like elements, and in which:

FIGURE 1 is a block diagram, partly schematic, of a television receiver incorporating an embodiment of the invention; and FIGURE 2 is a partial schematic diagram portraying a circuit equivalent to that shown in FIGURE 1.

The television receiver of FIGURE 1 includes an antenna 10 coupled to the input terminals of a radio-frequency (R.-F.) amplifier 11, which, like the other stages shown in block form, may include a plurality of amplifier stages. The output terminals of R.-F. amplifier 11 are coupled through a first detector 12 to the input circuit of an intermediate-frequency (I.-F.) amplifier 13, the output terminals of which are coupled to a video detector 14. One output circuit of video detector 14 is coupled through an audiofrequency (A.-F.) detector and amplifier 15 to a sound-reproducing device 16, which may take the form of a loud speaker, earphone, or other suitable transducer.

Another output circuit of video detector 14 is coupled to the input electrode or control grid 17 of a video amplifier 18. It is understood that, if desired, one or more additional amplifier stages may be coupled between detector 14 and amplifier 18. A conventional biasing arrangement, comprising cathode resistor 20 connected in parallel with a bypass capacitor 21, is coupled between the cathode 22 of video amplifier 18 and a point of reference potential, such as ground.

A series circuit including resistors 25 and 26 is coupled between output electrode 27 and a source of unidirectional operating potential, conventionally designated B+. The potential source is normally included within the television receiver and may be derived from a conversion and filtering arrangement in a manner well known and understood in the art. The junction of resistors 25 and 26 is coupled to the input circuit of a synchronizing (sync) signal separator 28. One output circuit of sync signal separator 28 is coupled through a line sweep system 30 to one terminal of the horizontal deflection coils 31 of a deflection yoke assembly of a cathode-ray tube 32; the other terminal of coil 31 is connected to ground. Another output circuit of sync signal separator 28 is coupled through a field sweep system 33 to one terminal of the vertical deflection coils 34, the other terminal of which is connected to ground.

A video load circuit including a reactive element 37 and a resistive element 38, is coupled between the anode 27 of amplifier 18 and B+. A bypass capacitor 40 is connected between intermediate or screen electrode 41 and ground.

In accordance with the invention, a tapped voltage divider 42, which in the embodiment of FIGURE 1 comprises separate resistors 43 and 44 having a common junction 45, is coupled between intermediate electrode 41 and B+. A capacitor 46 is coupled between junction 45 and B+. Further in accordance with the invention, a contrast control network including a potentiometer 47, which has a direct-current impedance large with respect to the direct-current impedance of video load 37, 38, is coupled between output electrode 27 and junction 45. A capictor 48 is connected between anode 27 and a fixed tap on potentiometer 47; another capacitor 49 is connected between anode 27 and the movable arm 50 of the contrast control potentiometer 47.

The movable arm 50 of potentiometer 47 is coupled through a peaking coil 55 and coupling capacitor 56 to an input electrode 57, which in the illustrated embodiment is the cathode, of image reproducer 32.

In operation, a composite television signal intercepted by antenna 10 is amplified in R.-F. amplifier 11 and then applied to first detector 12, for conversion to an intermediate-frequency signal which is coupled through I.-F. amplifier 13 to the video detector 14. Assuming the receiver to be of the intercarrier type, a first output signal from video detector 14, referred to as the intercarrier component, is coupled through audio circuit 15 and drives sound reproducing device 16.

Another output signal from video detector 14, referred to as the composite television signal, is coupled to the input electrode or control grid 17 of video amplifier 18. The principal video load in the plate circuit of amplifier 18 is video load 37, 38, through which nearly all the D.-C. tube current from amplifier 18 flows to B+. The D.-C. impedance of video load 37, 38 is small compared to either that of contrast control potentiometer 47, or to that of the principal sync load, the series circuit including resistors 25 and 26. Thus, for given values of video load impedance and supply potential, a predetermined operating potential is established at anode 27.

A portion of the output signal appearing at anode or output electrode 27 is coupled over resistor 25 to sync signal separator 28, which produces separate output signals for the horizontal and vertical deflection systems 30 and 33. In the line sweep system 30, a sawtooth waveform deflection signal of the proper characteristics and frequency is produced, and this signal is applied to the deflection coils 31. Similarly, a suitable vertical deflection signal is generated in the field sweep system 33, and is coupled to deflection coils 34. The two deflection signals thus applied effect proper scansion of the electron beam in cathode-ray tube 32.

The video signal amplified by stage 18 is also coupled to the upper terminal of contrast control potentiometer 47. A portion of this signal, depending upon the instantaneous position of movable arm 50, is coupled over the peaking coil 55 and capacitor 56 to the cathode 57 of image reproducer 32.

In accordance with the invention, resistors 43 and 44 are so proportioned that together they constitute a fixed-tap voltage divider for providing at tap or junction 45 a potential substantially equal to the anode potential appearing at output electrode 27. For the purposes of this explanation and the appended claims, the term "tapped voltage divider" is deemed to include a pair of series-connected resistors. Thus only a negligible D.-C. potential difference appears across potentiometer 47, and therefore very little direct current flows through the potentiometer. The video signal appears across potentiometer 47, and the contrast control functions in a normal manner. The negligible static D.-C. current flow through the contrast control potentiometer makes possible the use of a control having a much lower wattage rating than that of controls previously employed in such circuits. Thus a more economical contrast control circuit is provided by use of the lower-rated potentiometer.

It will be apparent to those skilled in the art that resistors 43 and 44 of voltage divider 42 can be replaced, as illustrated in FIGURE 2, by a single resistive element having a fixed tap provided thereon at junction 45. The fixed tap on the voltage divider is positioned to provide at junction 45 a voltage substantially equal to the anode voltage of amplifier 18. Other modifications and adaptations of the disclosed voltage divider arrangement will no doubt be suggested to those skilled in the art.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A contrast control circuit for a television receiver comprising: a video amplifier including an electron-discharge device having an input electrode, an intermediate electrode, and an output electrode; a source of unidirectional operating potential; a video load coupled between said output electrode and said source and establishing a predetermined operating potential at said output electrode; a voltage divider coupled between said intermediate electrode and said source and having a tap thereon which exhibits a potential substantially equal to said predetermined operating potential; a contrast control network having a direct-current impedance large with respect to the direct-current impedance of said video load, coupled between said output electrode and said tap; means for applying a received television signal to said input electrode; and means coupled to said contrast control network for utilizing at least a portion of the amplified voltage appearing at said output electrode.

2. A contrast control circuit for a television receiver comprising: a video amplifier including an electron-discharge device having an input electrode, an intermediate electrode, and an output electrode; a source of unidirectional operating potentia; a video load coupled between said output electrode and said source and establishing a predetermined operating potential at said output electrode; a voltage divider, comprising a pair of series connected resistors coupled between said intermediate electrode and said source and having a common junction therebetween which exhibits a potential substantially equal to said predetermined operating potential; a contrast control network having a direct-current impedance large with respect to the direct-current impedance of said video load, coupled between said output electrode and said junction; means for applying a received television signal to said input electrode; and means coupled to said contrast control network for utilizing at least a portion of the amplified voltage appearing at said output electrode.

3. A contrast control circuit for a television receiver comprising: a video amplifier including an electron-discharge device having an input electrode, an intermediate electrode, and an output electrode; a source of unidirectional operating potential; a video load coupled between said output electrode and said source and establishing a predetermined operating potential at said output electrode; a voltage divider coupled between said intermediate electrode and said source and having a tap thereon which exhibits a potential substantially equal to said predetermined operating potential; a capacitor coupled between said tap and said source; a contrast control network having a direct-current impedance large with respect to the direct-current impedance of said video load, coupled between said output electrode and said tap; means for applying a received television signal to said input electrode; and means coupled to said contrast control network for utilizing at least a portion of the amplified voltage appearing at said output electrode.

4. A contrast control circuit for a television receiver comprising: a video amplifier including an electron-discharge device having a control grid, a screen grid, and an anode; a source of unidirectional operating potential; a video load circuit, including a shunt peaking coil series-connected with a resistor, coupled between said anode and said source and establishing a predetermined operating potential at said anode; a voltage divider, comprising a pair of series-connected resistors coupled between said screen grid and said source and having a common junction therebetween which exhibits a potential substantially equal to said predetermined operating potential; a first capacitor connected between said junction and said source; a contrast control potentiometer, exhibiting a direct-current impedance large with respect to the direct-current impedance of said video load, including a movable arm, a fixed tap, and a pair of terminals, one of said terminals being connected to said anode and the other of said terminals being connected to said junction; a second capacitor coupled between said anode and said fixed tap; a third capacitor coupled between said anode and said movable arm; means for applying a received television signal to said control grid; and means coupled to the movable arm of said potentiometer for utilizing at least a portion of the amplified voltage appearing at said anode.

References Cited in the file of this patent

UNITED STATES PATENTS

| | | |
|---|---|---|
| 2,301,522 | Cawein | Nov. 10, 1942 |
| 2,356,141 | Applegarth | Aug. 22, 1944 |
| 2,797,258 | Denton | June 25, 1957 |
| 2,828,357 | Fyler | Mar. 25, 1958 |
| 2,891,106 | Stroh | June 16, 1959 |